(12) United States Patent
Wang et al.

(10) Patent No.: US 12,123,516 B2
(45) Date of Patent: Oct. 22, 2024

(54) HYDRAULIC MULTI-WAY VALVE WITH INDEPENDENT OIL-PORT CONTROL, AND CONTROL METHOD THEREFOR

(71) Applicants: JIANGSU HENGLI HYDRAULIC TECHNOLOGY CO., LTD., Jiangsu (CN); JIANGSU HENGLI HYDRAULIC CO., LTD., Jiangsu (CN)

(72) Inventors: Liping Wang, Jiangsu (CN); Zhonghua Zhou, Jiangsu (CN); Wangbo Yuan, Jiangsu (CN); Hongguang Liu, Jiangsu (CN)

(73) Assignees: JIANGSU HENGLI HYDRAULIC TECHNOLOGY CO., LTD., Jiangsu (CN); JIANGSU HENGLI HYDRAULIC CO., LTD., Jiangsu (CN)

( * ) Notice: Subject to any disclaimer, the term of this patent is extended or adjusted under 35 U.S.C. 154(b) by 245 days.

(21) Appl. No.: 17/924,031

(22) PCT Filed: Dec. 23, 2021

(86) PCT No.: PCT/CN2021/140996
§ 371 (c)(1),
(2) Date: Nov. 8, 2022

(87) PCT Pub. No.: WO2022/143430
PCT Pub. Date: Jul. 7, 2022

(65) Prior Publication Data
US 2023/0220926 A1    Jul. 13, 2023

(30) Foreign Application Priority Data
Jan. 4, 2021 (CN) .......................... 202110001897.X

(51) Int. Cl.
*F15B 13/04* (2006.01)
*F15B 13/043* (2006.01)
(Continued)

(52) U.S. Cl.
CPC ........ *F16K 31/426* (2013.01); *F15B 13/0435* (2013.01); *F16K 11/0712* (2013.01); *F16K 11/22* (2013.01)

(58) Field of Classification Search
CPC .... F16K 31/426; F16K 11/0712; F16K 11/22; F15B 13/0435
See application file for complete search history.

(56) References Cited

U.S. PATENT DOCUMENTS 3,587,640 A * 6/1971 Hanser ..................... F15B 13/04
                                                        137/596.14
3,603,348 A * 9/1971 Wright .................. F16K 31/426
                                                          251/25
(Continued)

FOREIGN PATENT DOCUMENTS

CN      102575693 A     7/2012
CN      103821787 A     5/2014
(Continued)

OTHER PUBLICATIONS

Hiroshi Fujiwara, "Notice of Reasons for Refusal for JP application 2023-516751", Jan. 30, 2024, JPO.

*Primary Examiner* — Kevin R Barss
(74) *Attorney, Agent, or Firm* — Bridgeway IP Law Group, PLLC; Jihun Kim

(57) ABSTRACT

A hydraulic multi-way valve with independent oil-port control, includes a multi-way valve body, an A valve core and a B valve core. The multi-way valve body has an A oil port and a B oil port, and includes an A cavity and a B cavity independent from each other therein. The A oil port, a P high-pressure oil port and a T high-pressure oil port are all (Continued)

in communication with the A cavity, the B oil port, the P high-pressure oil port and the T high-pressure oil port are all in communication with the B cavity. The A valve core is arranged in the A cavity, and the B valve core is arranged in the B cavity.

19 Claims, 5 Drawing Sheets

(51) Int. Cl.
  *F16K 11/07* (2006.01)
  *F16K 11/22* (2006.01)
  *F16K 31/42* (2006.01)

(56) References Cited

U.S. PATENT DOCUMENTS

| | | | | |
|---|---|---|---|---|
| 3,650,286 A | * | 3/1972 | Armstrong | F15B 18/00 137/99 |
| 4,827,982 A | * | 5/1989 | Inagaki | F16K 11/168 251/297 |
| 5,638,866 A | * | 6/1997 | Mueller | F16K 11/185 137/625.68 |
| 5,921,279 A | * | 7/1999 | Barber | F15B 13/0402 91/464 |
| 6,352,240 B1 | * | 3/2002 | Eckstein | F15B 11/17 251/114 |
| 6,470,912 B1 | * | 10/2002 | Haynes | F15B 13/0402 137/596.2 |
| 6,634,383 B2 | * | 10/2003 | Aarestad | F15B 13/0422 74/528 |
| 7,415,989 B2 | * | 8/2008 | Barber | F15B 13/0433 137/596.18 |
| 10,371,276 B2 | * | 8/2019 | Huynh | F15B 13/0814 |
| 11,781,573 B2 | * | 10/2023 | Slattery | F15B 21/12 137/624.14 |
| 11,841,716 B2 | * | 12/2023 | Ma | G05D 16/101 |
| 2013/0048893 A1 | * | 2/2013 | Barnes | F16K 31/60 251/231 |
| 2017/0051841 A1 | | 2/2017 | Huynh | |
| 2017/0248251 A1 | * | 8/2017 | Kopp | F15B 13/0435 |
| 2017/0254431 A1 | * | 9/2017 | Kopp | F15B 13/0435 |

FOREIGN PATENT DOCUMENTS

| | | |
|---|---|---|
| CN | 112728166 A | 4/2021 |
| CN | 113236623 A | 8/2021 |
| CN | 214617263 U | 11/2021 |
| DE | 3637345 A1 | 3/1988 |
| JP | H06280816 A | 10/1994 |
| JP | 2002235702 A | 8/2002 |
| JP | 2018035909 A | 3/2018 |

\* cited by examiner

HYDRAULIC MULTI-WAY VALVE WITH INDEPENDENT OIL-PORT CONTROL, AND CONTROL METHOD THEREFOR

CROSS-REFERENCE TO RELATED APPLICATIONS

This application is a national phase entry under 35 USC § 371 of International Application No. PCT/CN2021/140996, filed on Dec. 23, 2021, which is based on and claims priority to the Chinese Patent Application No. 202110001897.X filed on Jan. 4, 2021, the entire contents of which are incorporated herein by reference.

TECHNICAL FIELD

The present disclosure relates to a field of hydraulic transmission systems and electronic control, and more particularly, to a hydraulic multi-way valve with independent oil-port control and a control method therefor.

BACKGROUND

At present, a hydraulic transmission and control technology are widely used in various heavy equipment, such as engineering machinery, agricultural machinery and travelling machinery. As a key hydraulic element, especially a hydraulic multi-way valve is widely used in various heavy equipment. The hydraulic multi-way valve has a good versatility and a strong adaptability, and may control operating speeds and directions of various actuators such as an oil cylinder and a motor, and has characteristics of good precision control and inching. However, with the integration and development of the digital technology, Internet of things and intelligent technology, more and more technologies are combined with the hydraulic multi-way valve, and they are developing rapidly in the direction of electronization and intellectualization. The digital hydraulic technology makes much heavy machinery much more intelligent, faster and more accurate. However, a working oil port of the existing hydraulic multi-way valve is generally controlled in a unified manner, which cannot decouple the valve core and realize more complex intelligent control, thus resulting in waste of energy, limited adaptability and general work efficiency.

SUMMARY

A first aspect of the present disclosure proposes a hydraulic multi-way valve with independent oil-port control. The hydraulic multi-way valve with independent oil-port control includes: a multi-way valve body having an A oil port and a B oil port and including an A cavity and a B cavity independent to each other therein, the A oil port, a P high-pressure oil port and a T high-pressure oil port being each in communication with the A cavity, and the B oil port, the P high-pressure oil port and the T high-pressure oil port being each in communication with the B cavity; an A valve core arranged in the A cavity, and configured to reciprocate in the A cavity to control the opening and closing of the A oil port, the communication and non-communication of the P high-pressure oil port and the A valve core, and the communication and non-communication of the T high-pressure oil port and the A valve core; a B valve core arranged in the B cavity, and configured to reciprocate in the B cavity to control the opening and closing of the B oil port, the communication and non-communication of the P high-pressure oil port and the B valve core, and the communication and non-communication of the T high-pressure oil port and the B valve core; an A pilot driver mounted to the multi-way valve body and configured to control a movement of the A valve core; and a B pilot driver mounted to the multi-way valve body and configured to control a movement of the B valve core.

A second aspect of the present disclosure proposes a control method for a hydraulic multi-way valve with independent oil-port control. The hydraulic multi-way valve includes: a multi-way valve body having an A oil port and a B oil port and including an A cavity and a B cavity independent to each other therein, the A oil port, a P high-pressure oil port and a T high-pressure oil port being each in communication with the A cavity, and the B oil port, the P high-pressure oil port and the T high-pressure oil port being each in communication with the B cavity; an A valve core arranged in the A cavity, and configured to reciprocate in the A cavity to control the opening and closing of the A oil port, the communication and non-communication of the P high-pressure oil port and the A valve core, and the communication and non-communication of the T high-pressure oil port and the A valve core; a B valve core arranged in the B cavity, and configured to reciprocate in the B cavity to control the opening and closing of the B oil port, the communication and non-communication of the P high-pressure oil port and the B valve core, and the communication and non-communication of the T high-pressure oil port and the B valve core; an A pilot driver mounted to the multi-way valve body and configured to control a movement of the A valve core; and a B pilot driver mounted to the multi-way valve body and configured to control a movement of the B valve core. The hydraulic multi-way valve with independent oil-port control is connected to a controller, and the P high-pressure oil port and the T high-pressure oil port are connected to an oil tank.

The control method includes: when the hydraulic multi-way valve is in a standby state, each of the A pilot driver and the B pilot driver is not working, each of solenoid valves of the A pilot driver and the B pilot driver is in a de-energized state, the A valve core and the B valve core are in a neutral position, and each of the A oil port and the B oil port are in a closed state; when the hydraulic multi-way valve is in a working state, in which an oil is discharged out of the A oil port and returns into the B oil port, a first solenoid valve of the A pilot driver operates, and a pressure oil is input into a rear end of the A cavity, so as to push the A valve core to move forward for reversing, so that the P high-pressure oil port is in communication with the A oil port, and the pressure oil is output from the A oil port; a second solenoid valve of the B pilot driver operates, and the pressure oil is input into a front end of the B cavity, so as to push the B valve core to move backward for reversing the B valve core, so that the T high-pressure oil port is in communication with the B oil port, and the oil returns into the B oil port; and when the hydraulic multi-way valve is in a working state, in which the oil is discharged out of the B oil port and returns into the A oil port, a first solenoid valve of the B pilot driver operates, and the pressure oil is input into a front end of the A cavity, so as to push the A valve core to move backward for reversing, so that the T high-pressure oil port for oil return is in communication with the A oil port, and the oil returns into the A oil port; a second solenoid valve of the A pilot driver operates, and the pressure oil is input into a rear end of the B cavity, so as to push the B valve core to move forward for reversing, so that the P high-pressure oil port is in communication with the B oil port, and the pressure oil is output from the B oil port.

BRIEF DESCRIPTION OF THE DRAWINGS

The present disclosure will be further described with reference to accompanying drawings and embodiments.

DETAILED DESCRIPTION

Figure 1:
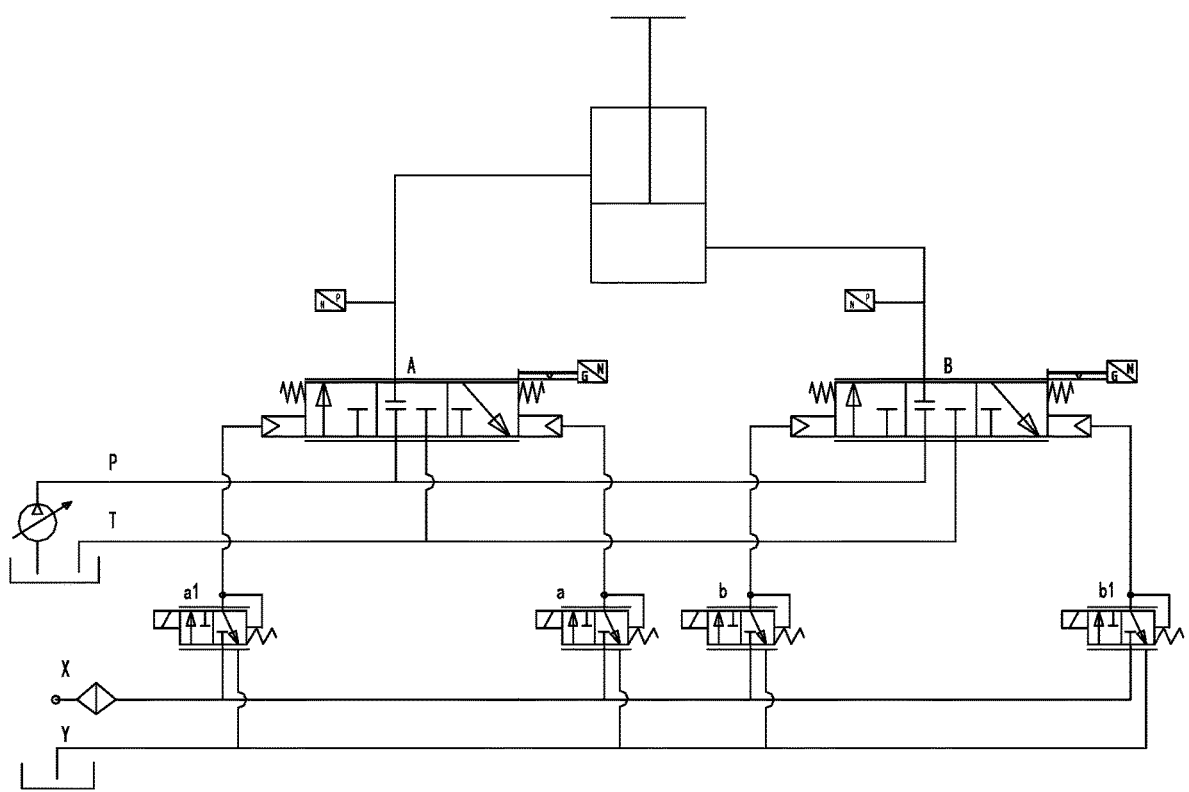
FIG. 1 is a hydraulic schematic diagram of a hydraulic multi-way valve with independent oil-port control according to the present disclosure.

The present disclosure will now be described in further detail with reference to the accompanying drawings. These accompanying drawings are simplified schematic views, which only schematically illustrate basic structures of the present disclosure. Therefore, they only show the components related to the present disclosure.

As shown in FIGS. 1-5, a hydraulic multi-way valve with independent oil-port control according to embodiments of the present disclosure includes a multi-way valve body 1, an A valve core 8 and a B valve core 9. The multi-way valve body 1 has an A oil port 2 and a B oil port 3. The multi-way valve body 1 has an A cavity 4 and a B cavity 5 independent from each other. Each of the A oil port 2, a P high-pressure oil port 6 and a T high-pressure oil port 7 is in communication with the A cavity 4. Each of the B oil port 3, the P high-pressure oil port 6 and the T high-pressure oil port 7 is in communication with the B cavity 5. The A valve core 8 is arranged in the A cavity 4. The A valve core 8 is configured to reciprocate in the A cavity 4 to control the opening and closing of the A oil port 2, the communication and non-communication of the P high-pressure oil port 6 and the A valve core 8, and the communication and non-communication of the T high-pressure oil port 7 and the A valve core 8. The B valve core 9 is arranged in the B cavity 5. The B valve core 9 is configured to reciprocate in the B cavity 5 to control the opening and closing of the B oil port 3, the communication and non-communication of the P high-pressure oil port 6 and the B valve core 9, and the communication and non-communication of the T high-pressure oil port 7 and the B valve core 9. Each independent main valve core (the A valve core 8 and the B valve core 9) is controlled by two high-speed on-off solenoid valves, which control two ends of the main valve core, respectively.

An A pilot driver 10 is mounted to the multi-way valve body 1 and configured to control a movement of the A valve core 8, and a B pilot driver 11 is mounted to the multi-way valve body 1 and configured to control a movement of the B valve core 9.

The A pilot driver 10 is mounted to a rear end of the multi-way valve body 1 and has a solenoid valve a and a solenoid valve b1. The solenoid valve a is configured to control an oil supply into a rear end of the A cavity 4, and the solenoid valve b1 is configured to control an oil supply into a rear end of the B cavity 5. The B pilot driver 11 is mounted to a front end of the multi-way valve body 1 and has a solenoid valve a1 and a solenoid valve b. The solenoid valve a1 is configured to control an oil supply into a front end of the A cavity 4, and the solenoid valve b is configured to control an oil supply into a front end of the B cavity 5. The pilot driver may have an electro-hydraulic control, so as to control an opening of the main valve core by the quick response of the high-speed on-off solenoid valve. The solenoid valves a and b work simultaneously, and the solenoid valves a1 and b1 work simultaneously. The solenoid valve is in a two-position three-way form, and applicable to various hydraulic systems and has a strong versatility. The pilot driver is integrated with a controller, thus achieving the CAN bus control, allowing the software programming and performing the diverse control.

A structure of the A valve core 8 and a structure of the B valve core 9 may be the same or different. Specifically, the A valve core 8 includes an A core shaft 80. The A core shaft 80 includes a first A protruding ring 81, a second A protruding ring 82, a third A protruding ring 83 and a fourth A protruding ring 84 which are sequentially fixedly fitted over the A core shaft 80 from front to rear and spaced apart from each other. An outer diameter of the first A protruding ring 81, an outer diameter of the second A protruding ring 82, an outer diameter of the third A protruding ring 83 and an outer diameter of the fourth A protruding ring 84 are identical in size. Each of opposite surfaces of the second A protruding ring 82 and the third A protruding ring 83 has an A opening groove 85, the A opening groove 85 in the second A protruding ring 82 is in communication with an outer ring part of the second A protruding ring 82, and the A opening groove 85 in the third A protruding ring 83 is in communication with an outer ring part of the third A protruding ring 83. That is, a surface of the second A protruding ring 82 faces towards a surface of the third A protruding ring 83, and each of the surface of the second A protruding ring 82 and the surface of the third A protruding ring 83, which face towards each other, has the A opening groove 85.

The B valve core 9 includes a B core shaft 91. The B core shaft 91 includes a first B protruding ring 91, a second B protruding ring 92, a third B protruding ring 93 and a fourth B protruding ring 94 which are sequentially fixedly fitted over the B core shaft 91 from front to rear and spaced apart from each other. An outer diameter of the first B protruding ring 91, an outer diameter of the second B protruding ring 92, an outer diameter of the third B protruding ring 93 and an outer diameter of the fourth B protruding ring 94 are identical in size. Each of opposite surfaces of the second B protruding ring 92 and the third B protruding ring 93 has a B opening groove 95, the B opening groove 95 in the second B protruding ring 92 is in communication with an outer ring part of the second B protruding ring 92, and the B opening groove 95 in the third B protruding ring 93 is in communication with an outer ring part of the third B protruding ring 93. That is, a surface of the second B protruding ring 92 faces towards a surface of the third B protruding ring 93, and each of the surface of the second B protruding ring 92 and the surface of the third B protruding ring 93, which face towards each other, has the B opening groove 95. The A opening groove 85 in the A valve core 8 and the B opening groove 95 in the B valve core 9 are configured to allow the oil to pass through.

In an example, the A protruding ring and the B protruding ring may have a same outer diameter.

The A opening groove 85 and the B opening groove 95 may have any suitable shape, such as a U shape. A plurality of A opening grooves 85 and a plurality of B opening grooves 95 are uniformly arranged on peripheries of the respective protruding rings. Openings of the A opening grooves 85 in the opposite surfaces of the second A protruding ring 82 and the third A protruding ring 83 are opposite to each other, and openings of the B opening grooves 95 in the opposite surfaces of the second B protruding ring 92 and the third B protruding ring 93 are opposite to each other.

The A cavity 4 has a cylindrical shape as a whole. The A core shaft 80 of the A valve core 8 and the A cavity 4 are coaxially arranged. The A cavity 4 has a first A annular groove 41, a second A annular groove 42 and a third A annular groove 43 which are sequentially arranged in the A cavity 4 from front to rear and each shaped into a loop.

When the A valve core 8 is in a neutral position, each of an outer ring part of the first A protruding ring 81, the outer ring part of the second A protruding ring 82, the outer ring part of the third A protruding ring 83 and an outer ring part of the fourth A protruding ring 84 abuts with an inner wall of the A cavity 4, so that the oil cannot flow between the respective outer ring parts of the first A protruding ring 81, the second A protruding ring 82, the third A protruding ring 83 and the fourth A protruding ring 84 and the inner wall of the A cavity 4. A first A oil cavity is defined by the first A protruding ring 81, the second A protruding ring 82 and the first A annular groove 41, and the first A oil cavity is only in communication with the P high-pressure oil port 6. A second A oil cavity is defined by the second A protruding ring 82, the third A protruding ring 83 and the second A annular groove 42, and the second A oil cavity is only in communication with the A oil port 2. A third A oil cavity is defined by the third A protruding ring 83, the fourth A protruding ring 84 and the third A annular groove 43, and the third A oil cavity is only in communication with the T high-pressure oil port 7.

The first A annular groove 41, the second A annular groove 42 and the third A annular groove 43 are closed relative to each other and are not in communication with each other. The A oil port 2 is only in communication with the second A annular groove 42, the P high-pressure oil port 6 is in communication with the first A annular groove 41, and the T high-pressure oil port 7 is in communication with the third A annular groove 43.

The B cavity 5 has a cylindrical shape as a whole. The B core shaft 90 of the B valve core 9 and the B cavity 5 are coaxially arranged. The B cavity 5 has a first B annular groove 51, a second B annular groove 52 and a third B annular groove 53 which are sequentially arranged in the B cavity 5 from front to rear and each shaped into a loop.

When the B valve core 9 is in a neutral position, each of an outer ring part of the first B protruding ring 91, the outer ring part of the second B protruding ring 92, the outer ring part of the third B protruding ring 93 and an outer ring part of the fourth B protruding ring 94 abuts with an inner wall of the B cavity 5, so that the oil cannot flow between the respective outer ring parts of the first B protruding ring 91, the second B protruding ring 92, the third B protruding ring 93 and the fourth B protruding ring 94 and the inner wall of the B cavity 5. A first B oil cavity is defined by the first B protruding ring 91, the second B protruding ring 92 and the first B annular groove 51, and the first B oil cavity is only in communication with the P high-pressure oil port 6. A second B oil cavity is defined by the second B protruding ring 92, the third B protruding ring 93 and the second B annular groove 52, and the second B oil cavity is only in communication with the B oil port 3. A third B oil cavity is defined by the third B protruding ring 93, the fourth B protruding ring 94 and the third B annular groove 53, and the third B oil cavity is only in communication with the T high-pressure oil port 7.

The first B annular groove 51, the second B annular groove 52 and the third B annular groove 53 are closed relative to each other and are not in communication with each other. The B oil port 3 is only in communication with the second B annular groove 52, the P high-pressure oil port 6 is in communication with the first B annular groove 51, and the T high-pressure oil port 7 is in communication with the third B annular groove 53.

The A cavity 4 further has a fourth A annular groove 44 in its rear portion. A rear end of the A valve core 8 is fixedly connected to an A limiting screw 12, and an A limiting spring 13 is further fitted over the A limiting screw 12. The A limiting spring 13 is located in the fourth A annular groove 44 and is in a compressed state. An A spring seat 14 is further arranged to either end of the A limiting spring 13, and the two A spring seats 14 abut with a front end face and a rear end face in the fourth annular groove 44, respectively.

The A pilot driver 10 is provided with an A push rod 19. The A pilot driver 10 is mounted to the rear end of the multi-way valve body 1. When the multi-way valve is in a neutral position, the A push rod 19 extends into the A cavity 4 and abuts with a rear end of the A limiting screw 12. An A restoring spring 20 is further arranged between the A push rod 19 and the A pilot driver 10.

The B cavity 5 further has a fourth B annular groove 54 in its rear portion. A rear end of the B valve core 9 is fixedly connected to a B limiting screw 15, and a B limiting spring 16 is further fitted over the B limiting screw 15. The B limiting spring 16 is located in the fourth B annular groove 54 and is in a compressed state. A B spring seat 17 is further arranged to either end of the B limiting spring 16, and the two B spring seats 17 abut with a front end face and a rear end face in the fourth B annular groove 54, respectively.

The B pilot driver 11 is provided with a B push rod 18. The B pilot driver 11 is mounted to the front end of the multi-way valve body 1. When the multi-way valve is in the neutral position, the B push rod 18 extends into the B cavity 5 and abuts with a front end of the B valve core 9. A B restoring spring 21 is further arranged between the B push rod 18 and the B pilot driver 11.

It should be understood that the fourth A annular groove 44 or the fourth B annular groove 54 may also be arranged in front portions of their respective cavities, and positions of other components accommodated therein may be adjusted adaptively. For example, the A push rod 19 or the B push rod 18 may directly abut with an end of the valve core or an end of the limiting screw as required.

The A pilot driver 10 includes a displacement sensor configured to detect the A valve core 8, and the B pilot driver 11 includes a displacement sensor configured to detect the B valve core 9. The pilot driver includes the displacement sensor, which mainly detects a displacement change of the push rod on each pilot driver and can accurately control the stroke of the main valve core, so as to form a closed-loop control, thus ensuring the accuracy and inching of the output flow.

The system is designed with a temperature sensor configured to detect a change of an ambient temperature and transmit temperature data to a controller. The controller may automatically adjust a mathematical model of software and compensate the temperature according to different ambient temperatures, so as to adapt to changes of oil viscosity and friction.

A control method for a hydraulic multi-way valve with independent oil-port control according to any one of the above embodiments of the present disclosure, in which the hydraulic multi-way valve is connected to a controller, and the P high-pressure oil port 6 and the T high-pressure oil port 7 are connected to an oil tank, has following control states.

Figure 2:
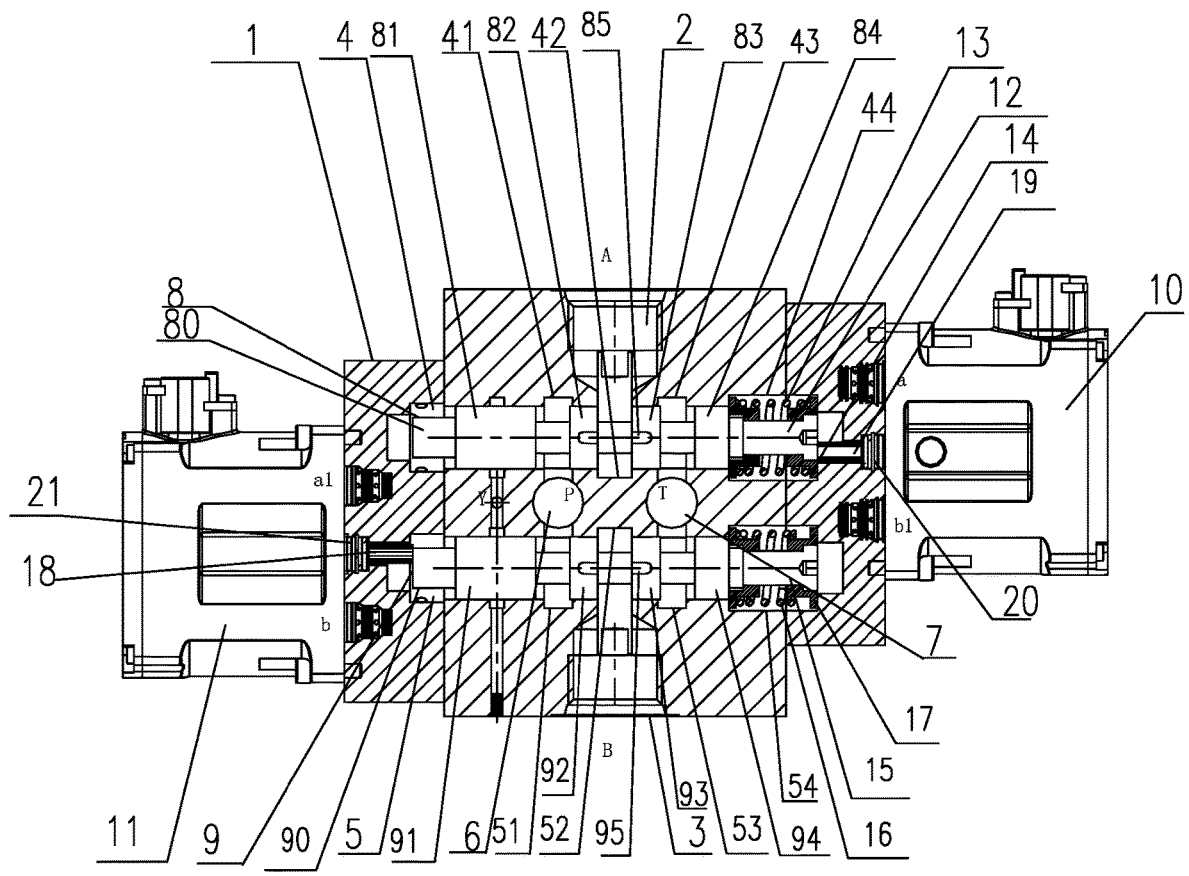
FIG. 2 is a schematic view of a hydraulic multi-way valve with independent oil-port control according to the present disclosure, in which a valve core of the hydraulic multi-way valve is in a neutral position.

As shown in FIG. 2, the hydraulic multi-way valve is in a standby state. At this time, each of the A pilot driver 10 and the B pilot driver 11 is not working, each of the solenoid valves a, b, a1 and b1 is in a de-energized state, the A valve core 8 and the B valve core 9 are in a neutral state, each of the A oil port 2 and the B oil port 3 is in a closed state, and all the springs (the A restoring spring, the B restoring spring, the A limiting spring 13 and the B limiting spring 16) are in a pre-compressed state.

Figure 3:
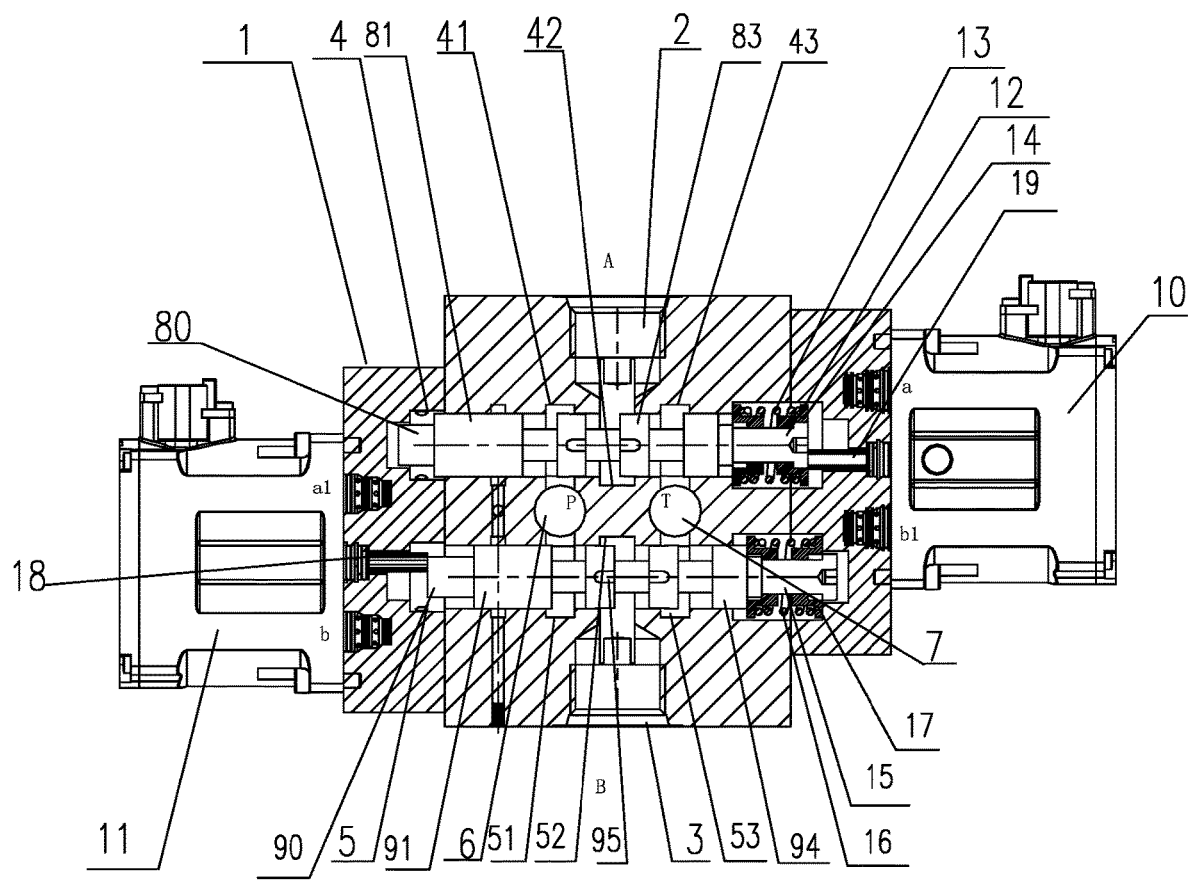
FIG. 3 is a schematic view of a hydraulic multi-way valve with independent oil-port control according to the present disclosure, in which oil is discharged out of an A oil port and returns into a B oil port.

As shown in FIG. 3, the multi-way valve is in a working state, in which oil is discharged out of the A oil port 2 and returns into the B oil port 3. At this time, the solenoid valve a of the A pilot driver 10 operates, and a pressure oil is input into the rear end of the A cavity 4 to overcome a restoring force of the spring, so that the pressure oil pushes the A valve core 8 to move forward for reversing. The second A protruding ring 82 is partially located in the first A annular groove 41, so that the A opening groove 85 in the second A protruding ring 82 is in communication with the first A annular groove 41. The oil flows into a space between the second A protruding ring 82 and the third A protruding ring 83 through the A opening groove 85 in the second A protruding ring 82. The space between the second A protruding ring 82 and the third A protruding ring 83 is in communication with the second A annular groove 42, and the second A annular groove 42 is in communication with the A oil port 2, so that the P high-pressure oil port 6 is in communication with the A oil port 2. The pressure oil is output from the A oil port 2. At this time, the oil in the third A annular groove 43 cannot enter the second A annular groove 42 through the A opening groove 85 in the third A protruding ring 83. The solenoid valve b of the B pilot driver 11 operates, and the pressure oil is input into the front end of the B cavity 5 to overcome a restoring force of the spring, so that the pressure oil pushes the B valve core 9 to move backward and the B valve core 9 reverses. The third B protruding ring 93 is partially located in the third B annular groove 53, so that the B opening groove 95 in the third B protruding ring 93 is in communication with the third B annular groove 53, and the oil in the second B annular groove 52 flows into a space between the third B protruding ring 93 and the fourth B protruding ring 94 through the B opening groove 95 in the third B protruding ring 93. The space between the third B protruding ring 93 and the fourth B protruding ring 94 is in communication with the third B annular groove 53, the third B annular groove 53 is in communication with the T high-pressure oil port 7, and the B oil port 3 is in communication with the second B annular groove 52, so that the T high-pressure oil port 7 is in communication with the B oil port 3, and the oil returns into the B oil port 3. At this time, the oil in the first B annular groove 51 cannot enter the second B annular groove 52 through the B opening groove 95 in the second B protruding ring 93.

Figure 4:
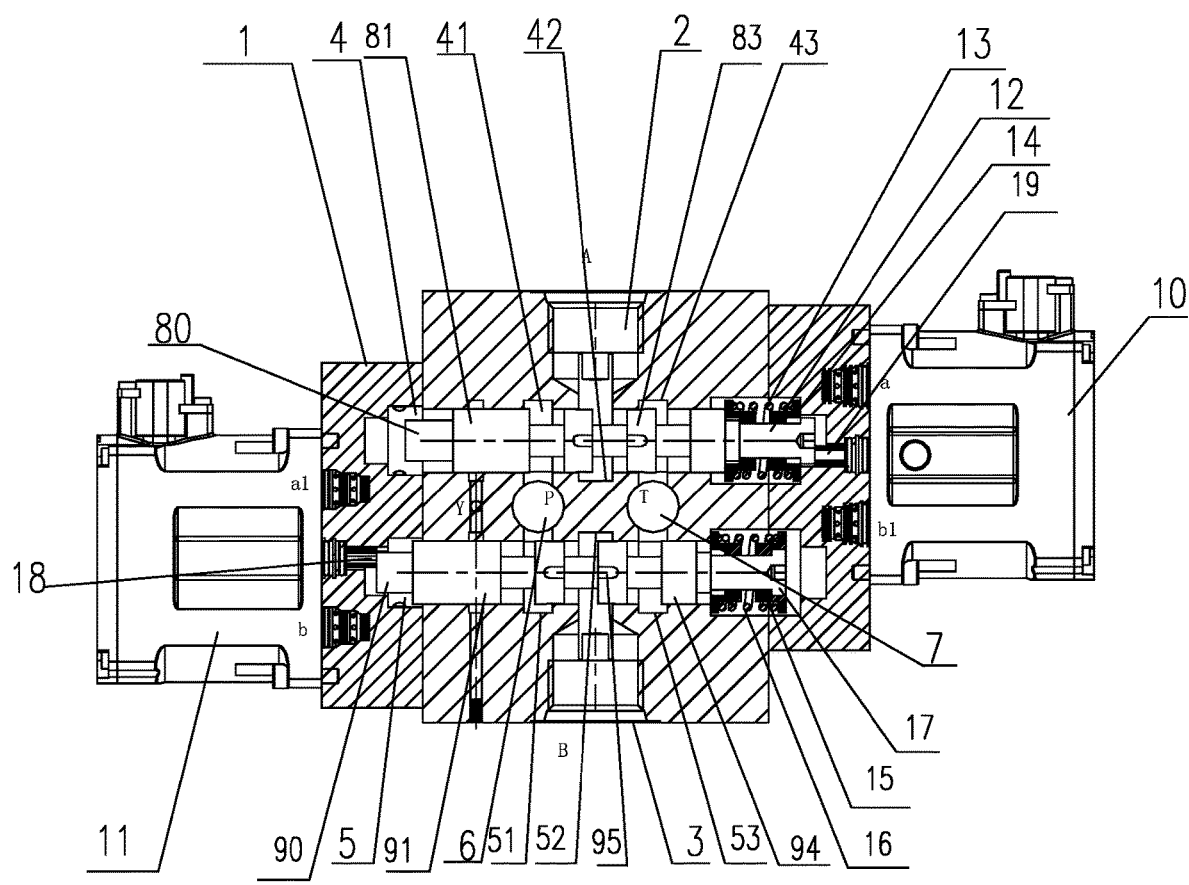
FIG. 4 is a schematic view of a hydraulic multi-way valve with independent oil-port control according to the present disclosure, in which oil is discharged out of a B oil port and returns into an A oil port.
Figure 5:
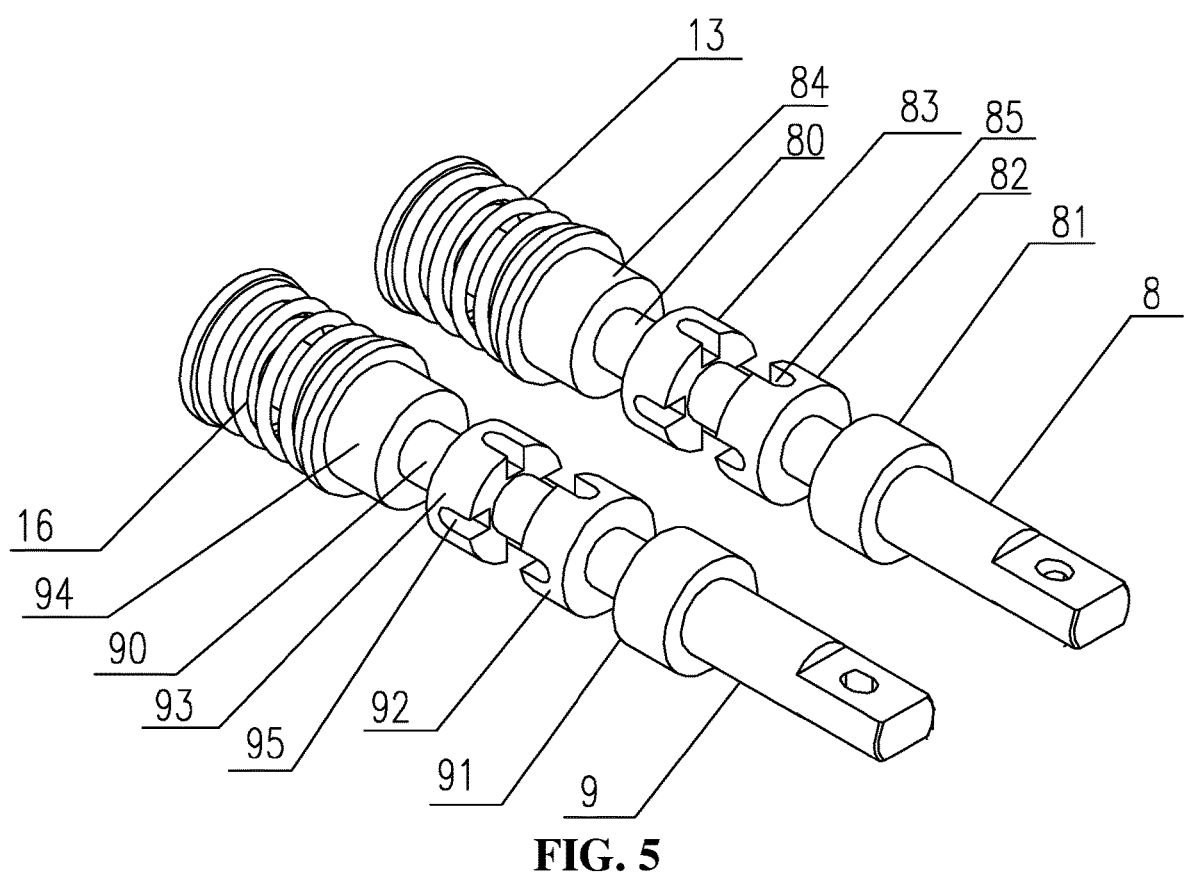
FIG. 5 is a schematic view of an A valve core and a B valve core of a hydraulic multi-way valve with independent oil-port control according to the present disclosure.

As shown in FIG. 4, the multi-way valve is in a working state, in which the oil is discharged out of the B oil port 3 and returns into the A oil port 2. The solenoid valve a1 of the B pilot driver 11 operates, and the pressure oil is input into the front end of the A cavity 4, so as to push the A valve core 8 to move backward for reversing, so that the T high-pressure oil port 7 for oil return is in communication with the A oil port 2, and the oil returns into the A oil port 2. The solenoid valve b1 of the A pilot driver 10 operates, and the pressure oil is input into the rear end of the B cavity 5, so as to push the B valve core 9 to move forward for reversing, so that the P high-pressure oil port 6 is in communication with the B oil port 3, and the pressure oil is output from the B oil port 3.

The A push rod 19 may abut with the end of the A limiting screw 12. The movement of the A valve core 8 allows the A push rod 19 to move. The displacement sensor configured to detect the A push rod 19 can detect a displacement of the A push rod 19 and feed the displacement back to the controller, so as to perform the closed-loop control. The B push rod 18 may abut with the end of the B valve core 9. The movement of the B valve core 9 allows the B push rod 18 to move. The displacement sensor configured to detect the B push rod 18 can detect a displacement of the B push rod 18 and feed the displacement back to the controller, so as to perform the closed-loop control.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation and position as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms "first" and "second" are only used for description purposes and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounting," "interconnection," "connection," "fixing" shall be understood broadly, and may be, for example, fixed connections, detachable connections, or integrations; may also be mechanical connections or electrical connections; may also be direct connections or indirect connections via intervening media; may also be inner communications or interactions of two elements. For those skilled in the art, the specific meaning of the above terms in the present disclosure can be understood according to the specific situations.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Inspired by the above ideal embodiments according to the present disclosure, through the above description, those skilled in the art can make various changes and modifications without deviating from the scope of the technical idea of the present disclosure. The technical scope of the present disclosure is not limited to the content in the specification, and must be determined according to the scope of claims.

The invention claimed is:

1. A hydraulic multi-way valve with independent oil-port control, comprising:
    a multi-way valve body having an A oil port and a B oil port and comprising an A cavity and a B cavity independent to each other therein, each of the A oil port, a P high-pressure oil port and a T high-pressure oil port being in communication with the A cavity, and each of the B oil port, the P high-pressure oil port and the T high-pressure oil port being in communication with the B cavity;
    an A valve core arranged in the A cavity and configured to reciprocate in the A cavity to control the opening and closing of the A oil port, the communication and non-communication of the P high-pressure oil port and the A valve core, and the communication and non-communication of the T high-pressure oil port and the A valve core;
    a B valve core arranged in the B cavity and configured to reciprocate in the B cavity to control the opening and closing of the B oil port, the communication and non-communication of the P high-pressure oil port and the B valve core, and the communication and non-communication of the T high-pressure oil port and the B valve core;
    an A pilot driver mounted to the multi-way valve body and configured to control a movement of the A valve core; and
    a B pilot driver mounted to the multi-way valve body and configured to control a movement of the B valve core,
    wherein the A valve core comprises an A core shaft, the A core shaft has a first A protruding ring, a second A protruding ring, a third A protruding ring and a fourth A protruding ring, and the first A protruding ring, the second A protruding ring, the third A protruding ring and the fourth A protruding ring are sequentially fixedly fitted over the A core shaft from front to rear and spaced apart from each other, and abut with an inner wall of the A cavity; and
    the B valve core comprises a B core shaft, the B core shaft has a first B protruding ring, a second B protruding ring, a third B protruding ring and a fourth B protruding ring, and the first B protruding ring, the second B protruding ring, the third B protruding ring and the fourth B protruding ring are sequentially fixedly fitted over the B core shaft from front to rear and spaced apart from each other, and abut with an inner wall of the B cavity.

2. The hydraulic multi-way valve with independent oil-port control according to claim 1, wherein
    the A pilot driver is mounted to a rear end of the multi-way valve body and has a first solenoid valve and a second solenoid valve, the first solenoid valve of the A pilot driver is configured to control an oil supply into a rear end of the A cavity, and the second solenoid valve of the A pilot driver is configured to control an oil supply into a rear end of the B cavity; and
    the B pilot driver is mounted to a front end of the multi-way valve body and has a first solenoid valve and a second solenoid valve, the first solenoid valve of the B pilot driver is configured to control an oil supply into a front end of the A cavity, and the second solenoid valve of the B pilot driver is configured to control an oil supply into a front end of the B cavity.

3. The hydraulic multi-way valve with independent oil-port control according to claim 1, wherein the first A protruding ring, the second A protruding ring, the third A protruding ring and the fourth A protruding ring have a same outer diameter, and the first B protruding ring, the second B protruding ring, the third B protruding ring and the fourth B protruding ring have a same outer diameter.

4. The hydraulic multi-way valve with independent oil-port control according to claim 1, wherein
    each of opposite surfaces of the second A protruding ring and the third A protruding ring has an A opening groove, the A opening groove in the second A protruding ring is in communication with an outer ring part of the second A protruding ring, and the A opening groove in the third A protruding ring is in communication with an outer ring part of the third A protruding ring; and
    each of opposite surfaces of the second B protruding ring and the third B protruding ring has a B opening groove, the B opening groove in the second B protruding ring is in communication with an outer ring part of the second B protruding ring, and the B opening groove in the third B protruding ring is in communication with an outer ring part of the third B protruding ring.

5. The hydraulic multi-way valve with independent oil-port control according to claim 4, wherein the A opening groove and the B opening groove have a U shape, wherein openings of the A opening grooves in the opposite surfaces of the second A protruding ring and the third A protruding ring are opposite to each other, and openings of the B opening grooves in the opposite surfaces of the second B protruding ring and the third B protruding ring are opposite to each other.

6. The hydraulic multi-way valve with independent oil-port control according to claims 1, wherein the A cavity comprises a first A annular groove, a second A annular groove and a third A annular groove which are sequentially arranged in the A cavity from front to rear and each shaped into a loop,
    wherein when the A valve core is in a neutral position, the first A annular groove, the second A annular groove and the third A annular groove are closed relative to each other and are not in communication with each other, the A oil port is in communication with the second A annular groove, the P high-pressure oil port is in communication with the first A annular groove, and the T high-pressure oil port is in communication with the third A annular groove.

7. The hydraulic multi-way valve with independent oil-port control according to claim 6, wherein the A cavity further comprises a fourth A annular groove in a rear portion thereof, a rear end of the A valve core is fixedly connected to an A limiting screw, an A limiting spring is further fitted over the A limiting screw, the A limiting spring is located in the fourth A annular groove and is in a compressed state, an A spring seat is further arranged to either end of the A limiting spring, and two A spring seats abut with a front end face and a rear end face in the fourth annular groove, respectively.

8. The hydraulic multi-way valve with independent oil-port control according to claim 7, wherein the A pilot driver is provided with an A push rod, and the A push rod extends into the A cavity and abuts with a rear end of the A limiting screw.

9. The hydraulic multi-way valve with independent oil-port control according to claim 8, wherein an A restoring spring is arranged between the A push rod and the A pilot driver.

10. The hydraulic multi-way valve with independent oil-port control according to claims 1, wherein the B cavity comprises a first B annular groove, a second B annular groove and a third B annular groove which are sequentially arranged in the B cavity from front to rear and each shaped into a loop,
   wherein when the B valve core is in a neutral position, the first B annular groove, the second B annular groove and the third B annular groove are closed relative to each other and are not in communication with each other, the B oil port is in communication with the second B annular groove, the P high-pressure oil port is in communication with the first B annular groove, and the T high-pressure oil port is in communication with the third B annular groove.

11. The hydraulic multi-way valve with independent oil-port control according to claim 10, wherein the B cavity further comprises a fourth B annular groove in a rear portion thereof, a rear end of the B valve core is fixedly connected to a B limiting screw, a B limiting spring is further fitted over the B limiting screw, the B limiting spring is located in the fourth B annular groove and is in a compressed state, a B spring seat is further arranged to either end of the B limiting spring, and two B spring seats abut with a front end face and a rear end face in the fourth B annular groove, respectively.

12. The hydraulic multi-way valve with independent oil-port control according to claims 1, wherein the A cavity has a cylindrical shape as a whole, and the B cavity has a cylindrical shape as a whole.

13. The hydraulic multi-way valve with independent oil-port control according to claims 1, wherein the A valve core and the A cavity are coaxially arranged, and the B valve core and the B cavity are coaxially arranged.

14. The hydraulic multi-way valve with independent oil-port control according to claims 1, wherein the B pilot driver is provided with a B push rod, and the B push rod extends into the B cavity and abuts with a front end of the B valve core.

15. The hydraulic multi-way valve with independent oil-port control according to claim 14, wherein a B restoring spring is arranged between the B push rod and the B pilot driver.

16. The hydraulic multi-way valve with independent oil-port control according to claims 1, wherein the A pilot driver comprises a displacement sensor configured to detect the A valve core, and the B pilot driver comprises a displacement sensor configured to detect the B valve core.

17. A control method for a hydraulic multi-way valve with independent oil-port control, the hydraulic multi-way valve with independent oil-port control comprising:
   a multi-way valve body having an A oil port and a B oil port and comprising an A cavity and a B cavity independent to each other therein, each of the A oil port, a P high-pressure oil port and a T high-pressure oil port being in communication with the A cavity, and each of the B oil port, the P high-pressure oil port and the T high-pressure oil port being in communication with the B cavity;
   an A valve core arranged in the A cavity and configured to reciprocate in the A cavity to control the opening and closing of the A oil port, the communication and non-communication of the P high-pressure oil port and the A valve core, and the communication and non-communication of the T high-pressure oil port and the A valve core;
   a B valve core arranged in the B cavity and configured to reciprocate in the B cavity to control the opening and closing of the B oil port, the communication and non-communication of the P high-pressure oil port and the B valve core, and the communication and non-communication of the T high-pressure oil port and the B valve core;
   an A pilot driver mounted to the multi-way valve body and configured to control a movement of the A valve core; and
   a B pilot driver mounted to the multi-way valve body and configured to control a movement of the B valve core,
   wherein the A valve core comprises an A core shaft, the A core shaft has a first A protruding ring, a second A protruding ring, a third A protruding ring and a fourth A protruding ring, and the first A protruding ring, the second A protruding ring, the third A protruding ring and the fourth A protruding ring are sequentially fixedly fitted over the A core shaft from front to rear and spaced apart from each other, and abut with an inner wall of the A cavity; and
   the B valve core comprises a B core shaft, the B core shaft has a first B protruding ring, a second B protruding ring, a third B protruding ring and a fourth B protruding ring, and the first B protruding ring, the second B protruding ring, the third B protruding ring and the fourth B protruding ring are sequentially fixedly fitted over the B core shaft from front to rear and spaced apart from each other, and abut with an inner wall of the B cavity,
   wherein the hydraulic multi-way valve is connected to a controller, and the P high-pressure oil port and the T high-pressure oil port are connected to an oil tank,
   wherein the control method comprises:
   when the hydraulic multi-way valve is in a standby state, each of the A pilot driver and the B pilot driver is not working, each of solenoid valves of the A pilot driver and the B pilot driver is in a de-energized state, the A valve core and the B valve core are in a neutral position, and each of the A oil port and the B oil port is in a closed state;
   when the hydraulic multi-way valve is in a working state, in which an oil is discharged out of the A oil port and returns into the B oil port, a first solenoid valve of the A pilot driver operates, and a pressure oil is input into a rear end of the A cavity, so as to push the A valve core to move forward for reversing, so that the P high-pressure oil port is in communication with the A oil port, and the pressure oil is output from the A oil port; a second solenoid valve of the B pilot driver operates, and the pressure oil is input into a front end of the B cavity, so as to push the B valve core to move backward for reversing, so that the T high-pressure oil port is in communication with the B oil port, and the oil returns into the B oil port; and when the hydraulic multi-way valve is in a working state, in which the oil is discharged out of the B oil port and returns into the A oil port, a first solenoid valve of the B pilot driver operates, and the pressure oil is input into a front end of the A cavity, so as to push the A valve core to move backward for reversing, so that the T high-pressure oil port for oil return is in communication with the A oil port, and the oil returns into the A oil port; a second solenoid valve of the A pilot driver operates, and the pressure oil is input into a rear end of the B cavity, so as to push the B valve core to move forward for reversing, so that the P high-pressure oil port is in communication with the B oil port, and the pressure oil is output from the B oil port.

18. The control method for the hydraulic multi-way valve with independent oil-port control according to claim 17, wherein a movement of the A valve core allows the A push rod to move, a displacement sensor for detecting the A push rod is configured to detect a displacement of the A push rod and feed the displacement back to the controller, a movement of the B valve core allows the B push rod to move, and a displacement sensor for detecting the B push rod is configured to detect a displacement of the B push rod and feed the displacement back to the controller.

19. The control method for the hydraulic multi-way valve with independent oil-port control according to claim 17, wherein the hydraulic multi-way valve comprises a temperature sensor configured to detect a change of an ambient temperature and transmit temperature data to the controller, and the controller is configured to perform a temperature compensation adjustment according to different ambient temperatures.

* * * * *